US011664510B2

(12) United States Patent
Yoshitomi et al.

(10) Patent No.: US 11,664,510 B2
(45) Date of Patent: May 30, 2023

(54) FUEL CELL VEHICLE

(71) Applicant: HONDA MOTOR CO., LTD., Tokyo (JP)

(72) Inventors: Ryoichi Yoshitomi, Wako (JP); Kohei Kakuta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 17/060,972

(22) Filed: Oct. 1, 2020

(65) Prior Publication Data

US 2021/0104756 A1 Apr. 8, 2021

(30) Foreign Application Priority Data

Oct. 4, 2019 (JP) ............................ JP2019-183376

(51) Int. Cl.

*H01M 8/04007* (2016.01)
*B60L 50/72* (2019.01)
*H01M 8/04089* (2016.01)

(52) U.S. Cl.

CPC ......... *H01M 8/04074* (2013.01); *B60L 50/72* (2019.02); *H01M 8/04089* (2013.01); *H01M 2250/20* (2013.01)

(58) Field of Classification Search

CPC ........................... B60L 50/72; H01M 8/04074
See application file for complete search history.

(56) References Cited

U.S. PATENT DOCUMENTS 11,251,444 B2 2/2022 Fujita
2006/0051636 A1* 3/2006 Kubo ................. H01M 8/2457 429/432
2010/0062319 A1* 3/2010 Katano ............. H01M 8/04097 429/411
2016/0064756 A1* 3/2016 Yuzuriha ........... H01M 8/04843 429/410
2017/0259694 A1* 9/2017 Fukuda ............. H01M 8/04201
2018/0233756 A1* 8/2018 Fujita ................ H01M 8/04231
2019/0036139 A1* 1/2019 Tsubouchi ........ H01M 8/04425

FOREIGN PATENT DOCUMENTS

CN 108365240 A * 8/2018 ........ H01M 8/04388
CN 113422087 A * 9/2021
JP 2008-130492 A 6/2008
JP 2018-128109 A 8/2018

OTHER PUBLICATIONS

Office Action dated Mar. 15, 2022 issued over the corresponding Japanese Patent Application No. 2019-183376 with the English translation thereof.

* cited by examiner

*Primary Examiner* — Nicholas P D'Aniello
*Assistant Examiner* — Mary G Henshaw
(74) *Attorney, Agent, or Firm* — Carrier Shende & Associates, P.C.; Joseph P. Carrier; Jeffrey T. Gedeon

(57) ABSTRACT

A fuel cell vehicle includes a fuel cell stack, a hydrogen gas supply pipe for supplying a hydrogen gas to the fuel cell stack, and injectors provided at positions along the hydrogen gas supply pipe, for injecting the hydrogen gas to the fuel cell stack. The hydrogen gas supply pipe includes a buffer, provided on the upstream side of the injectors, and the hydrogen gas can flow through the buffer. The buffer includes a branch pipe branched from the hydrogen gas supply pipe, and the buffer tank coupled to the branch pipe so as to allow the hydrogen gas to flow through the buffer tank.

7 Claims, 6 Drawing Sheets

11

FUEL CELL VEHICLE

CROSS-REFERENCE TO RELATED APPLICATION

This application is based upon and claims the benefit of priority from Japanese Patent Application No. 2019-183376 filed on Oct. 4, 2019, the contents of which are incorporated herein by reference.

BACKGROUND OF THE INVENTION

Field of the Invention

The present invention relates to a fuel cell vehicle equipped with a fuel cell system for supplying a hydrogen gas to a fuel cell stack.

Description of the Related Art

A fuel cell vehicle includes a fuel cell stack, a hydrogen gas supply pipe for supplying a hydrogen gas to the fuel cell stack, and an injector provided at a position along a hydrogen gas supply pipe, for injecting the hydrogen gas to the fuel cell stack. In the fuel cell vehicle of this type, pressure pulsation is produced in the hydrogen gas on the upstream side of the injector, by operation of the injector, and noises are produced in a vehicle compartment by vibration of the hydrogen gas supply pipe produced due to the pressure pulsation of the hydrogen gas.

In an attempt to reduce such noises, for example, Japanese Laid-Open Patent Publication No. 2008-130492 discloses a fuel cell vehicle having a surge tank directly provided on an upper part and a side part of an injector. The surge tank suppresses noises in the vehicle compartment by suppressing rapid pressure decrease in the hydrogen gas due to operation of the injector.

SUMMARY OF THE INVENTION

In this regard, the surge tank of Japanese Laid-Open Patent Publication No. 2008-130492 has serial structure where the surge tank is directly provided on a hydrogen gas supply pipe. In the case of adopting the surge tank having the serial structure, it is necessary to sufficiently increase the volume of the surge tank for attenuating the pressure pulsation of the hydrogen gas. Therefore, the surge tank requires a large space in a front box accommodating the fuel cell stack and other auxiliary devices of a fuel cell system, and the surge tank cannot be accommodated in the front box easily.

The present invention has been made to solve the above problem, and an object of the present invention is to provide a fuel cell vehicle in which it is possible to suitably suppress pressure pulsation of a hydrogen gas produced due to operation of an injector, while reducing noises produced due to vibration of a hydrogen gas supply pipe, and it is possible to accommodate component parts of the fuel cell vehicle easily.

In order to achieve the above objet, according to an aspect of the present invention, a fuel cell vehicle is provided. The fuel cell vehicle includes a fuel cell stack, a hydrogen gas supply pipe configured to supply a hydrogen gas to the fuel cell stack, and an injector provided at a position along the hydrogen gas supply pipe, and configured to inject the hydrogen gas to the fuel cell stack. The hydrogen gas supply pipe includes a buffer provided on the upstream side of the injector. The buffer is configured to allow the hydrogen gas to flow through the buffer. The buffer includes a branch pipe branched from the hydrogen gas supply pipe, and a buffer tank coupled to the branch pipe so as to allow the hydrogen gas to flow through the buffer tank.

In the fuel cell vehicle, since the hydrogen gas supply pipe includes the branch pipe and the buffer tank which are arranged on the upstream side of the injector, the pressure pulsation of the hydrogen gas caused by operation of the injector is suppressed suitably by the buffer, and thus, noises produced due to vibrations of the hydrogen gas supply pipe are reduced. Further, it is possible to reduce the size of the buffer tank in comparison with the buffer tank having serial structure. Further, it becomes possible to dispose the buffer tank in a suitable space through the branch pipe. Accordingly, in the fuel cell vehicle, it is possible to simplify accommodation of component parts in the buffer.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of the present invention will be described in detail with reference to the accompanying drawings.

Figure 1:
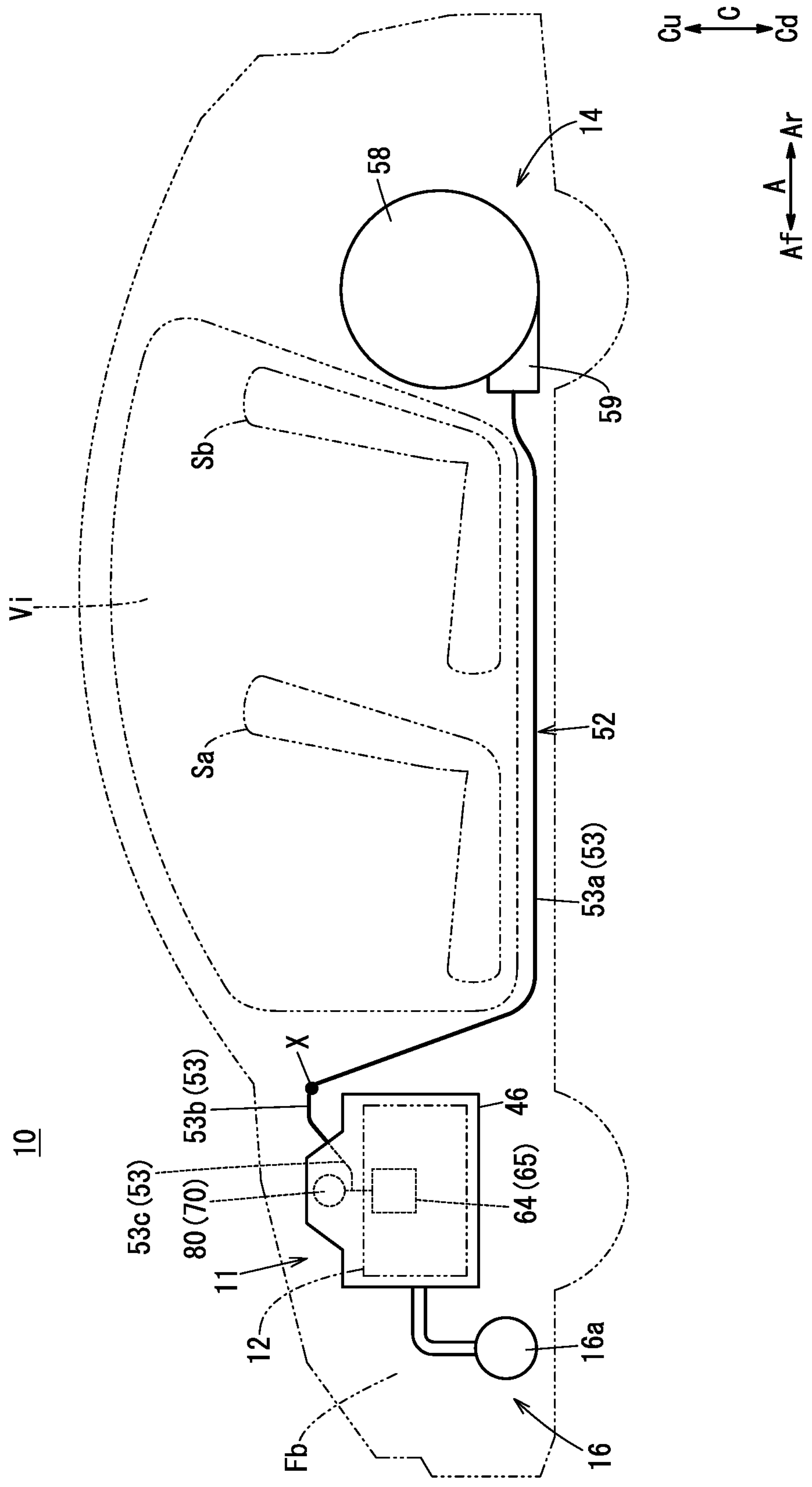
FIG. 1 is a side view schematically showing a fuel cell system mounted in a fuel cell vehicle according to an embodiment of the present invention.

As shown in FIG. 1, a fuel cell vehicle 10 (fuel cell automobile: hereinafter simply referred to as the vehicle 10) according to an embodiment of the present invention includes a fuel cell system 11 for generating electrical energy for traveling. The fuel cell system 11 includes a fuel cell stack 12, an anode system apparatus 14 for supplying a hydrogen gas (a fuel gas or an anode gas) to the fuel cell stack 12, a cathode system apparatus 16 for supplying the air (an oxygen-containing gas or a cathode gas) to the fuel cell stack 12, and a cooling apparatus 18 (see FIG. 3) for circulating a coolant to the fuel cell stack 12.

A front box Fb (motor room) is provided on the front side of the vehicle 10 in the vehicle length direction (in the direction indicated by an arrow Af). The front box Fb accommodates a motor (not shown) which is driven to rotate, consuming electrical energy supplied from the fuel cell system 11. Auxiliary devices of the fuel cell system 11 (the fuel cell stack 12, the anode system apparatus, 14, the cathode system apparatus 16, and the cooling apparatus 18) are accommodated in the front box Fb. In FIG. 1, injectors 64 and a buffer 70 described later are shown as main auxiliary devices of the anode system apparatus 14, and a compressor 16*a* is shown as a main auxiliary device of the cathode system apparatus 16.

A vehicle compartment Vi is formed on the rear side of the front box Fb (in a direction indicated by an arrow Ar). The vehicle compartment Vi is used as a passenger space of the vehicle 10. Front seats Sa and rear seats Sb are installed in the vehicle compartment Vi. Further, a hydrogen tank 58 as an auxiliary device of the anode system apparatus 14 is mounted on the rear side of a rear seat Sb of the vehicle 10 (in the direction indicated by the arrow Ar). Further, the anode system apparatus 14 includes a hydrogen gas supply pipe 52 for supplying a hydrogen gas from the hydrogen tank 58 to the fuel cell stack 12. The hydrogen gas supply pipe 52 extends in the vehicle length direction (indicated by the arrow A) inside the space under the floor of the vehicle 10 (bottom of the vehicle frame), and connects the auxiliary device of the anode system apparatus 14 inside the front box Fb and the hydrogen tank 58. It should be noted that the hydrogen tank 58 may be provided under the rear sheet Sb.

Figure 2:
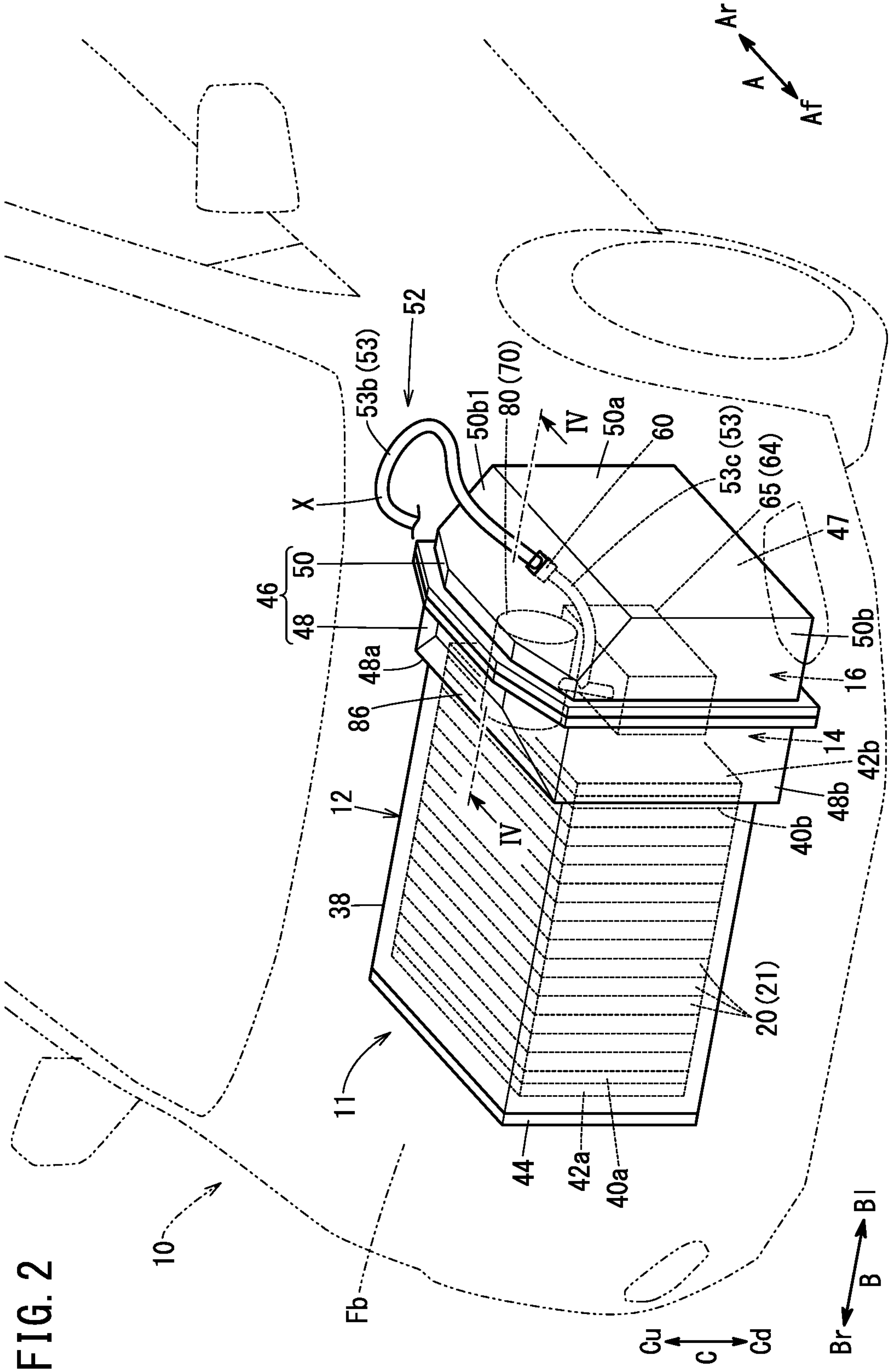
FIG. 2 is a partial perspective view schematically showing a layout state of a fuel cell system accommodated in a front box of the fuel cell vehicle shown in FIG. 1.

As shown in FIG. 2, the fuel cell stack 12 of the fuel cell system 11 includes a plurality of power generation cells 20 for performing power generation by electrochemical reactions of a hydrogen gas and an oxygen-containing gas in the air. In the state where the fuel cell stack 12 is mounted in the vehicle 10, the plurality of power generation cells 20 are stacked together in a vehicle width direction (indicated by an arrow B) such that electrode surfaces are oriented upright to form a stack body 21. It should be noted that the plurality of power generation cells 20 may be stacked together in a vehicle length direction of the vehicle 10 or in a gravity direction (direction perpendicular to the horizontal orientation of the vehicle 10: in the direction indicated by an arrow C).

Figure 3:
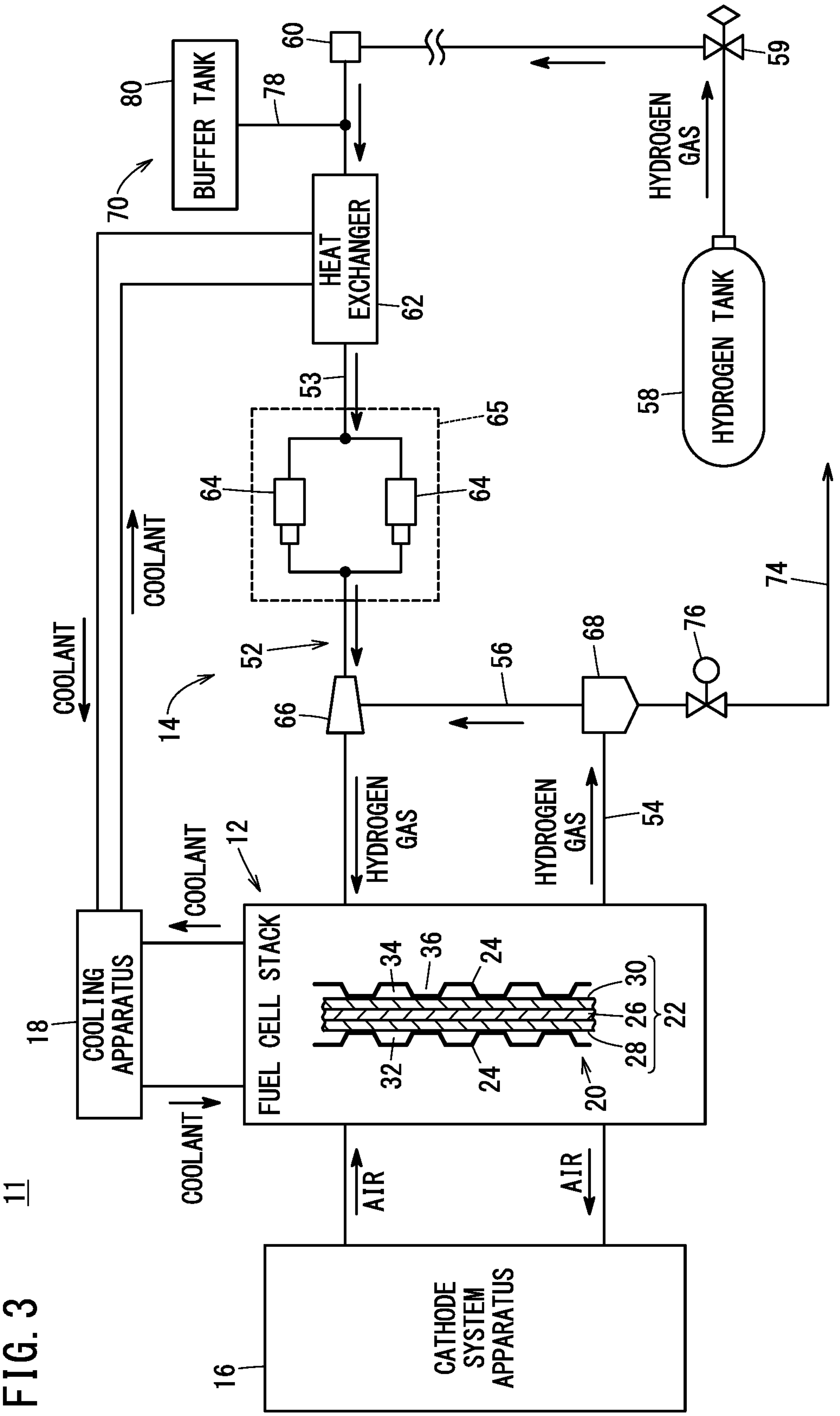
FIG. 3 is a block diagram showing structure of the fuel cell system.

As shown in FIG. 3, the power generation cell 20 includes a membrane electrode assembly 22 (hereinafter referred to as the "MEA 22"), and two separators 24 sandwiching the MEA 22. The MEA 22 includes an electrolyte membrane 26 (e.g., solid polymer electrolyte membrane (cation ion exchange membrane)), an anode 28 provided on one surface of the electrolyte membrane 26, and a cathode 30 provided on the other surface of the electrolyte membrane 26. An anode gas flow field 32 as a passage of a hydrogen gas and a cathode gas flow field 34 as a passage of the air are formed in the surfaces of the two separators 24 facing the MEA 22. Further, when the plurality of power generation cells 20 are stacked together, a coolant flow field 36 as a passage of the coolant is formed on surfaces of the two separators 24 which face each other.

Further, the fuel cell stack 12 includes a plurality of fluid passages (anode gas passages, cathode gas passages, and coolant passages) (not shown) for allowing the hydrogen gas, the air, and the coolant to flow in the stacking direction of the plurality of power generation cells 20. In the stack body 21, the anode gas passage is connected to the anode gas flow field 32, the cathode gas passage is connected to the cathode gas flow field 34, and the coolant passage is connected to the coolant flow field 36.

In the fuel cell stack 12, the hydrogen gas is supplied from the anode system apparatus 14. In the fuel cell stack 12, the hydrogen gas flows through the anode gas passage (anode gas supply passage) into the anode gas flow field 32, and is consumed in the power generation at the anode 28. The hydrogen gas (containing the unreacted hydrogen gas) consumed in the power generation flows from the anode gas flow field 32 into the anode gas passage (anode gas discharge passage), and the hydrogen gas is discharged into the anode system apparatus 14 outside the fuel cell stack 12.

Further, the air is supplied to the fuel cell stack 12 by the cathode system apparatus 16. In the fuel cell stack 12, the air flows through the cathode gas passage (cathode gas supply passage) into the cathode gas flow field 34, and is consumed in the power generation at the cathode 30. The air consumed in the power generation flows from the cathode gas flow field 34 to the cathode gas passage (cathode gas discharge passage), and the air is discharged into the cathode system apparatus 16 outside the fuel cell stack 12.

Further, the coolant is supplied to the fuel cell stack 12 by the cooling apparatus 18. In the fuel cell stack 12, the coolant flows through the coolant passage (coolant supply passage) into the coolant flow field 36, and cools the power generation cells 20. After the coolant cools the power generation cells 20, the coolant flows from the coolant flow field 36 into the coolant passage (coolant discharge passage), and the coolant is discharged into the cooling apparatus 18 outside the fuel cell stack 12.

Further, as shown in FIG. 2, the fuel cell stack 12 accommodates the stack body 21 in a rectangular cylindrical stack case 38. At one end (in the direction indicated by an arrow Br) of the stack body 21 in the direction indicated by the arrow B, a terminal plate 40*a* is provided, and an insulating plate 42*a* is provided outside the terminal plate 40*a*. The terminal plate 40*a* and the insulating plate 42*a* are accommodated in the stack case 38. An end plate 44 is attached to the stack case 38 on the side indicated by the arrow Br. The end plate 44 closes the space in the stack case 38. The end plate 44 applies the tightening load to the power generation cells 20 in the stacking direction.

At the other end (indicated by an arrow Bl) of the stack body 21 in the direction indicated by the arrow B, a terminal plate 40*b* is provided. An insulating plate 42*b* is provided outside the terminal plate 40*b*. The terminal plate 40*b* and the insulating plate 42*b* are accommodated in the stack case 38. Further, an auxiliary device case 46 is attached to the stack case 38 on the side indicated by the arrow Bl. The auxiliary device case 46 closes the accommodation space of the stack case 38.

The auxiliary device case 46 is a case having an internal accommodation space 47. The auxiliary device case 46 protects the auxiliary devices and part of pipes of the fuel cell system 11 accommodated in the accommodation space 47. The auxiliary device case 46 includes a first case member 48 having a recessed shape joined the stack case 38, and a second case member 50 having a recessed shape joined to the first case member 48.

Figure 4:
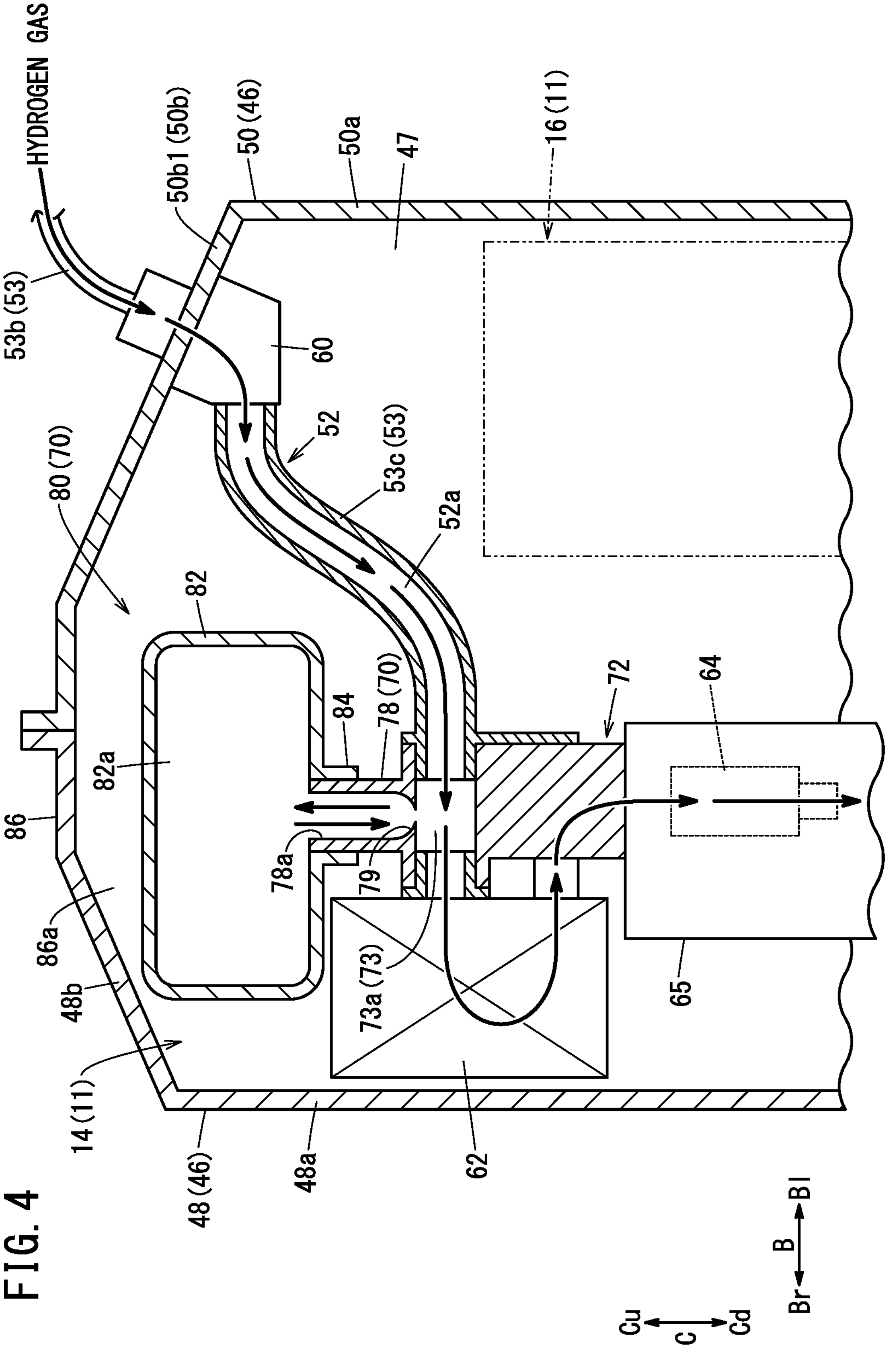
FIG. 4 is a cross sectional view taken along a line IV-IV in FIG. 2.

The first case member 48 includes an attachment wall 48*a*, joined to the stack case 38 using bolts, and a peripheral wall 48*b* continuous with an outer peripheral portion of the attachment wall 48*a* and protruding in a direction indicated by the arrow Bl (see FIG. 4). The attachment wall 48*a* has a function of an end plate for applying a tightening load in a stacking direction to the stack body 21 of the power generation cell 20. A plurality of holes (not shown) connected to an anode gas passage, a cathode gas passage, and a coolant passage of the power generation cell 20, respectively, are formed in the attachment wall 48*a*. Pipes (not shown) as passages of the hydrogen gas, the air, and the coolant are connected to the holes.

The second case member 50 includes a side wall 50*a* positioned on the side indicated by the arrow Bl, and a peripheral wall 50*b* continuous with an outer peripheral portion of the side wall 50*a* and protruding in the direction indicated by the arrow Br (see also FIG. 4). The first case member 48 and the second case member 50 are assembled together, by joining flanges provided at protruding ends of the peripheral walls 48*b*, 50*b* of the first case member 48 and the second case member 50 together.

Further, the auxiliary devices of the anode system apparatus 14 and the auxiliary devices of the cathode system apparatus 16 are provided in the accommodation space 47 of the auxiliary device case 46. The auxiliary devices of the anode system apparatus 14 are positioned adjacent to the attachment wall 48*a* in the auxiliary device case 46 (on the side indicated by the arrow Br). The auxiliary devices of the cathode system apparatus 16 are positioned adjacent to the anode system apparatus 14 (on the side indicated by the arrow Bl) (see also FIG. 4).

As show in FIG. 3, the anode system apparatus 14 includes a hydrogen gas supply pipe 52 for supplying a hydrogen gas to the fuel cell stack 12, and a hydrogen gas discharge pipe 54 for discharging the hydrogen gas consumed in the power generation of the fuel cell stack 12. Further, a circulation bypass pipe 56 for returning the unconsumed hydrogen contained in the hydrogen gas of the hydrogen gas discharge pipe 54 to the hydrogen gas supply pipe 52 is connected to a position between the hydrogen gas supply pipe 52 and the hydrogen gas discharge pipe 54.

Examples of the auxiliary devices of the anode system apparatus 14 include a hydrogen tank 58, a joint mechanism 60, the heat exchanger 62, a plurality of injectors 64, an ejector 66, and a gas liquid separator 68. Further, in the anode system apparatus 14 according to the embodiment of the present invention, the hydrogen gas supply pipe 52 (upstream side pipe 53) includes the buffer 70 provided on the upstream side of the injectors 64.

The hydrogen tank 58 is connected to one end of the hydrogen gas supply pipe 52, and supplies the high pressure hydrogen gas stored in the hydrogen tank 58 to the hydrogen gas supply pipe 52. A regulator 59 is provided at a position adjacent to a flow outlet port of the hydrogen tank 58. The regulator 59 decreases the pressure of the hydrogen gas which flowed out of the hydrogen tank 58 into the hydrogen gas supply pipe 52.

A portion of the hydrogen gas supply pipe 52 extending from the hydrogen tank 58 to a vehicle body fastening point X provided at the border between the front box Fb and the vehicle compartment Vi of the vehicle 10 is made up of a rigid pipe 53*a* fixed to the vehicle body frame (see FIG. 1). Another portion of the hydrogen gas supply pipe 52 extending from the vehicle body fastening point X to the joint mechanism 60 is made up of an elastically deformable (flexible) resin pipe (flexible pipe) 53*b*.

As shown in FIGS. 2 and 3, the joint mechanism 60 is a structural unit where the hydrogen gas can flow, and the joint mechanism 60 is formed by connecting a hydrogen gas supply pipe 52 outside the auxiliary device case 46 extending from the hydrogen tank 58, and the hydrogen gas supply pipe 52 inside the auxiliary device case 46 together. That is, auxiliary devices (the heat exchanger 62, the injectors 64, the ejector 66, the gas liquid separator 68, and the buffer 70) on the downstream side of the joint mechanism 60 are accommodated in the auxiliary device case 46. The joint mechanism 60 is provided on the inclined wall 50*b*1 of a peripheral wall 50*b* of the auxiliary device case 46 (first case member 48). Still another portion of the hydrogen gas supply pipe 52 connected to the joint mechanism 60 inside the auxiliary device case 46 is made up of a hard metal pipe 53*c*.

The heat exchanger 62 heats the hydrogen gas supplied from the hydrogen tank 58. Coolant (e.g., mixed liquid of pure water and ethylene glycol) which flowed through the fuel cell stack 12 is used as the heat medium which performs heat exchange with the hydrogen gas in the heat exchanger 62.

The plurality of injectors 64 (two, in the illustrated embodiment) form one injector unit 65, and inject the hydrogen gas supplied from the upstream side in the hydrogen gas supply pipe 52 at a predetermined flow rate, toward the downstream side at a predetermined injection pressure. The hydrogen gas supply pipe 52 has a branch point(s) and a meeting point(s) in accordance with the injectors 64. The injector unit 65 has, on the upstream, a pipe unit 72 (see FIG. 4) forming such a branch point. It is noted that the anode system apparatus 14 may include one injector 64, or three or more injectors 64.

The ejector 66 sucks the hydrogen gas from the circulation bypass pipe 56, and supplies the hydrogen gas to the fuel cell stack 12 on the downstream side, by the negative pressure generated by movement of the hydrogen gas injected from the injector unit 65.

The gas liquid separator 68 is provided between the hydrogen gas discharge pipe 54 and the circulation bypass pipe 56. The liquid water contained in the hydrogen gas discharged from the fuel cell stack 12 (water produced during power generation) is separated from the hydrogen gas. A discharge pipe 74 for discharging the separated water and the reactant gas (hydrogen gas and/or the nitrogen gas) is connected to the gas liquid separator 68. A valve 76 (purge valve) for opening/closing at suitable timing is provided in this discharge pipe 74.

It should be noted that the anode system apparatus 14 may include a pump circulating the hydrogen gas to the hydrogen gas supply pipe 52, e.g., at a position along the circulation bypass pipe 56, and may include a valve (check valve) for allowing the hydrogen gas to flow in one direction.

In the anode system apparatus 14 having the above structure, the pressure of the hydrogen gas flowing inside the anode gas changes at the plurality of injectors 64 (injector units 65) as borders. That is, the hydrogen gas flowing through the upstream side pipe 53 from the regulator 59 to each of the injectors 64 has a relatively high pressure (which is lower than the hydrogen gas in the hydrogen tank 58, and thus, will be referred to as the "middle pressure"). On the other hand, the pressure of the hydrogen gas flowing through the hydrogen gas supply pipe 52, the hydrogen gas discharge pipe 54, and the circulating bypass pipe 56 on the downstream side of the injectors 64 is lower than the pressure of the hydrogen gas in the upstream side pipe 53.

As shown in FIG. 1, the hydrogen gas having the middle pressure flows through the hydrogen gas supply pipe 52 (upstream side pipe 53) having a large length extending in the direction indicated by the arrow A of the vehicle 10 outside the auxiliary device case 46. Vibration of pulsation of the hydrogen gas (injection of the hydrogen gas and storage of the hydrogen gas) by operation of each of the injectors 64 is transmitted to the hydrogen gas in this upstream side pipe 53. Therefore, assuming that the vehicle 10 does not has the buffer 70, pressure pulsation of the hydrogen gas is transmitted to the fixed pipe 53*a* to induce vibration, and consequently, noises are produced from the entire space under the floor in the vehicle length direction.

As shown in FIGS. 3 and 4, the buffer 70 of the fuel cell system 11 is provided in the upstream side pipe 53 of each of the injectors 64, and has a function of suppressing noises produced by operation of each of the injectors 64 through the hydrogen gas. Specifically, the buffer 70 is provided in the upstream side pipe 53 between the joint mechanism 60 and the heat exchanger 62, and accommodated inside the auxiliary device case 46. It should be noted that the position where the buffer 70 is installed is not limited to the upstream side of the heat exchanger 62. The buffer 70 may be provided on the downstream side of the heat exchanger 62, and may be positioned outside the auxiliary device case 46 (a position between the joint mechanism 60 and the vehicle body fastening point X).

The buffer 70 includes a branch pipe 78 having one end coupled to the upstream side pipe 53, and a buffer tank 80 coupled to the other end of the branch pipe 78. That is, the buffer 70 has a side branch structure branched from the upstream side pipe 53.

In the auxiliary device case 46, the upstream side pipe 53 is made up of a metal pipe 53*c* and the above pipe unit 72. The branch pipe 78 is formed integrally with the pipe unit 72. Specifically, the pipe unit 72 has a substantially T-shaped connection portion 73 in a cross sectional view, and the metal pipe 53*c* is connected to the connection portion 73 on the side indicated by the arrow Bl, and the upstream side of the heat exchanger 62 is connected to the connection portion 73 on the side indicated by the arrow Br. A seal member (not shown) for preventing leakage of the hydrogen gas is provided at a connecting position of each member. It should be noted that the downstream part of the heat exchanger 62 is connected to a position below the connection portion 73 of the pipe unit 72 in the gravity direction (side indicated by an arrow Cd). The pipe unit 72 distributes the hydrogen gas in the bifurcated structure (not shown) below the connection portion 73, and supplies the hydrogen gas to each of the injectors 64.

The branch pipe 78 protrudes straight from an upper part of the connection portion 73 in the upper direction (indicated by an arrow Cu). A branch channel 78*a* connected to a connection channel 73*a* of the connection portion 73 (channel 52*a* of the hydrogen gas supply pipe 52) is provided inside the branch pipe 78. This branch channel 78*a* intersects with the connection channel 73*a* (intersects perpendicularly with the connection channel 73*a* in the embodiment of the present invention). In the branch pipe 78, the hydrogen gas flows through the branch channel 78*a*, and flows from the connection channel 73*a* into the buffer tank 80, and flows out of the buffer tank 80 into the connection channel 73*a*. Further, an orifice 79 is provided at a portion where the branch pipe 78 is connected to the pipe unit 72. The channel cross sectional area of the orifice 79 is reduced toward the pipe unit 72 (downward in the gravity direction: connection portion 73).

For example, a buffer tank 80 is provided at the uppermost position in the gravity direction (on the side indicated by the arrow Cu) among the auxiliary devices of the anode system apparatus 14 provided in the auxiliary device case 46. In the embodiment of the present invention, the buffer tank 80 is provided at substantially the same height position as the joint mechanism 60 coupled to the wall 50*b*1 of the auxiliary device case 46. It should be noted that the height of the buffer tank 80 in the auxiliary device case 46 may be determined arbitrarily.

The buffer tank 80 includes a cylindrical tank body 82 elongated in a vehicle width direction (in a direction indicated by an arrow B), and a port 84 provided below a body part of the tank body 82 in the gravity direction (the side indicated by the arrow Cd). A cylindrical internal space 82*a* having a predetermined volume is formed inside the tank body 82.

The port 84 is coupled to the branch pipe 78 in a state where the branch channel 78*a* and the internal space 82*a* communicate with each other. A seal member (not shown) for preventing leakage of the hydrogen gas is provided between the branch pipe 78 and the port 84. For example, the tank body 82 and the port 84 are formed integrally with each other to have structure where the hydrogen gas is contained in the buffer tank 80 hermetically.

As shown in FIGS. 2 and 4, the buffer tank 80 is provided inside the upper protrusion 86 protruding upward in the gravity direction (side indicate by the arrow Cu) in the peripheral walls 48*b*, 50*b* of the auxiliary device case 46. The upper protrusion 86 has a trapezoidal shape in a side view as viewed in a direction indicated by the arrow Bl, and includes an internal expansion space 86*a* which expands the accommodation space 47 of the auxiliary device case 46. The buffer tank 80 disposed in the expansion space 86*a* is not in contact with the auxiliary device case 46. It should be noted that, the buffer tank 80 is formed separately from the auxiliary device case 46. Alternatively, the buffer tank 80 may be formed integrally with the auxiliary device case 46.

Further, the buffer tank 80 is not limited to have a cylindrical shape. The buffer tank may have various three-dimensional shape. For example, the buffer tank 80 may have a substantially triangular prism shape or a polyhedron shape along the shape of the upper protrusion 86. The port 84 connected to the branch pipe 78 can be designed as appropriate in correspondence with the layout of the buffer tank 80. For example, the port 84 may be provided on one of both end surfaces of the cylindrical tank body 82 in the direction indicated by the arrow B.

A vehicle 10 according to an embodiment of the present invention basically has the above structure. Hereinafter, operation of the vehicle 10 will be described below.

The vehicle 10 travels based on electrical energy produced in the power generation of the fuel cell system 11. As shown in FIG. 3, in the fuel cell system 11, in the power generation, the hydrogen gas is supplied to, and discharged from the fuel cell stack 12 by the anode system apparatus 14, and the air is supplied to, and discharged from the fuel cell stack 12 by the cathode system apparatus 16. Each of the power generation cells 20 of the fuel cell stack 12 outputs electrical energy based on the hydrogen gas which flowed through the anode gas flow field 32 and supplied to the anode 28, and the oxygen-gas in the air which flowed through the cathode gas flow field 34 and supplied to the cathode 30. Further, during operation of the fuel cell stack 12, the fuel cell system 11 operates the cooling apparatus 18 to circulate the coolant, and cool the fuel cell stack 12.

As shown in FIG. 1, at the time of supplying the hydrogen gas, the anode system apparatus 14 discharges the hydrogen gas from the hydrogen tank 58 into the hydrogen gas supply pipe 52 (upstream side pipe 53). The pressure of the hydrogen gas is reduced by the regulator 59, and the hydrogen gas flows through the upstream side pipe 53 (fixed pipe 53*a*) to the front side of the vehicle 10 (in the direction indicated by the arrow Af). In the front box Fb on the front side of the vehicle body fastening point X, after the hydrogen gas flows through the resin pipe 53*b*, the hydrogen gas flows from the joint mechanism 60 into the channel of the hydrogen gas inside the auxiliary device case 46.

As shown in FIG. 4, in the auxiliary device case 46, the hydrogen gas flows through the metal pipe 53*c* from the joint mechanism 60, and moves to the connection portion 73 of the pipe unit 72. Then, some of the hydrogen gas flows through the branch pipe 78 of the pipe unit 72 into the buffer tank 80. The hydrogen gas which flowed into the buffer tank 80 returns to the connection portion 73 at suitable timing (e.g., at the time of injecting hydrogen of the injector 64). Further, after the hydrogen gas flows through the heat exchanger 62 coupled to the connection portion 73, the hydrogen gas flows through the bifurcated structure of the pipe unit 72, the plurality of injectors 64, and the ejector 66. Then, the hydrogen gas is supplied to the fuel cell stack 12.

At this time, each of the injectors 64 moves a valve plug (not shown), and repeats injection of the hydrogen gas and storage of the hydrogen gas. The pressure pulsation of the hydrogen gas as a result of operation of each of the injectors 64 is transmitted to the hydrogen gas in the upstream side pipe 53 as well. The upstream side pipe 53 is provided with the buffer 70 to alleviate the pressure decrease in the hydrogen gas, and suppress pressure pulsation of the hydrogen gas on the upstream side of the buffer 70. In particular, the tank body 82 has the cylindrical shape. In the structure, it is possible to reduce the stress caused by the hydrogen gas locally produced in the internal surfaces of the internal space 82*a*. Therefore, vibration induction of the upstream side pipe 53 (fixed pipe 53*a*) extending under the floor of the vehicle 10 is suppressed. Accordingly, it is possible to significantly reduce the noises from the upstream side pipe 53 to the vehicle compartment Vi (see FIG. 1). Further, the orifice 79 effectively reduces the sounds produced as a result of pressure pulsation of the hydrogen gas.

Figure 5A:
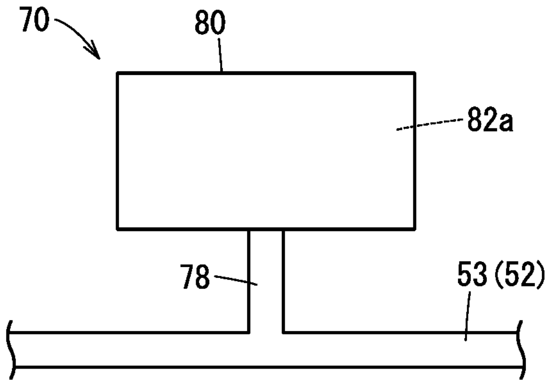
FIG. 5A is a view schematically showing a buffer having side branch structure.

Further, as shown in FIG. 5A, the buffer 70 has a side branch structure including the branch pipe 78 and the buffer tank 80. In the structure, it is possible to reduce the volume of the buffer tank 80, and suitably suppress pressure pulsation of the hydrogen gas.

Figure 5B:
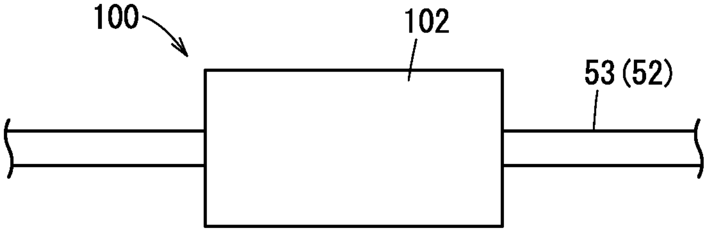
FIG. 5B is a view schematically showing a buffer having serial structure.

Next, FIG. 5B shows a buffer 100 having a serial structure, as an example for comparison with the buffer 70 according to the embodiment of the present invention. In the buffer 100, a buffer tank 102 is directly provided on the hydrogen gas supply pipe 52 (without any branch pipe 78). That is, the serial structure of the buffer 100 is a structure where a channel cross sectional area of the channel 52*a* of the hydrogen gas supply pipe 52 is increased to thereby increase the volume of the channel 52*a*.

Figure 5C:
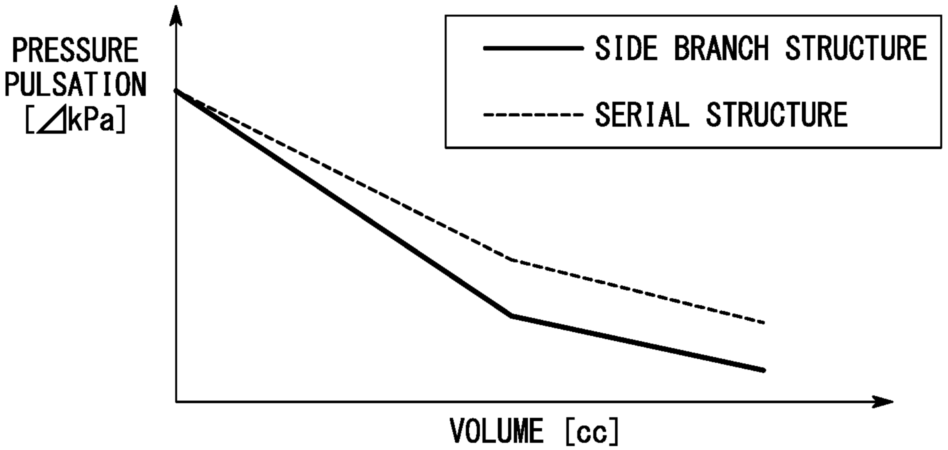
FIG. 5C is a graph showing the relationship between volumes of the side branch structure and the serial structure and pressure pulsation.

As shown in FIG. 5C, in the case where the buffer 70 having the side branch structure and the buffer 100 having the serial structure are compared with each other, under the condition that there is no difference in the volume of the hydrogen gas, the pressure pulsation of the hydrogen gas in the buffer 70 having the side branch structure is smaller than in the buffer 100 having the serial structure. That is, in the case of reducing the pressure pulsation of the hydrogen gas to the same extent, the buffer 70 having the side branch structure can have a smaller volume than the buffer 100 having the serial structure. Therefore, by adopting the buffer 70 having the side branch structure, it is possible to achieve size reduction. Further, the buffer tank 80 connected through the branch pipe 78 can be provided in an appropriate space inside the auxiliary device case 46.

It should be noted that the present invention is not limited to the above embodiment. Various modifications may be made in line with the gist of the present invention.

Figure 6A:
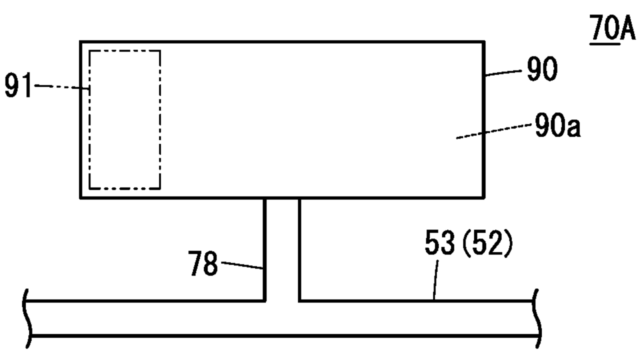
FIG. 6A is a diagram schematically showing a buffer according to a first modified embodiment.

A buffer 70A according to a first modified embodiment shown in FIG. 6A includes a buffer tank 90. The buffer tank 90 has an extension length (axial length of the cylinder) which is longer than that of the buffer tank 80, so that the buffer tank 90 has a larger volume of internal space 90*a* which is larger than the buffer tank 80. A two dot chain line in the buffer tank 90 in FIG. 6A shows an increased area 91 by which the buffer tank 90 is larger in size than the buffer tank 80. That is, in the buffer 70, 70A, even in the case where there are constraints on the accommodation layout of the front box Fb in the radial direction, by changing the longitudinal length of the buffer tank 80, 90 (the length in one direction), it is possible to reset (change) the volume of the buffer tank 80, 90 easily.

Figure 6B:
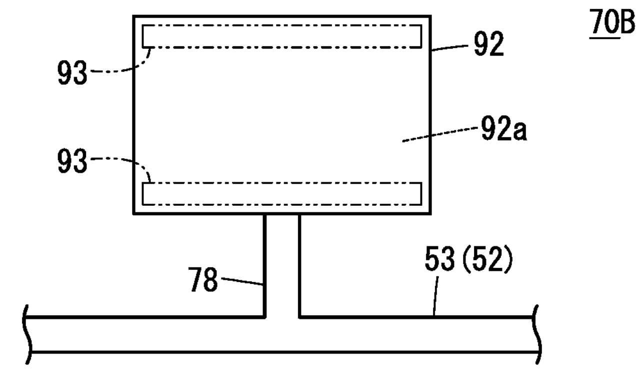
FIG. 6B is a diagram schematically showing a buffer according to a second modified embodiment.

A buffer 70B according to a second modified embodiment shown in FIG. 6B includes a buffer tank 92. The buffer tank 92 has a radial length which is longer than that of the buffer tank 80, so that the volume of internal space 92*a* of the buffer tank 92 is larger than that of the buffer tank 80. A two dot chain line in the buffer tank 92 in FIG. 6B shows an increased area 93 by which the buffer tank 92 is larger in size than the buffer tank 80. That is, in the buffer 70, 70B, even in the case where there are constraints on the accommodation layout of the front box Fb in the longitudinal direction of the buffer tank 80, 92, by changing the length in the radial direction, it is possible to reset (change) the volume of the buffer tank 80, 92 easily.

In this regard, in the vehicle 10, the suppression level of the pressure pulsation may be subject to the change or the shape change of the component parts of the fuel cell system 11. For dealing with such a situation, in the buffer 70, 70A, 70B, by changing the length of the buffer tank 80 in a predetermined direction depending on the change or the shape change of the component parts, it is possible to easily achieve a structure where the pressure pulsation of the hydrogen gas is suppressed.

Figure 6C:
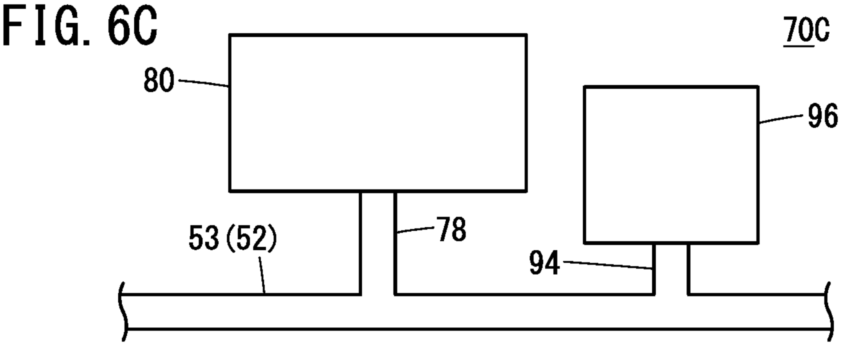
FIG. 6C is a diagram schematically showing a buffer according to a third modified embodiment.

Further, in a buffer 70C according to a third embodiment shown in FIG. 6C, another additional tank 96 is provided in parallel with single side branch structure (the branch pipe 78 and the buffer tank 80). In the embodiment of the present invention, the additional tank 96 has a side branch structure where the additional tank 96 is connected to the hydrogen gas supply pipe 52 through a connection pipe 94 (branch pipe). Since the buffer 70C is provided with the additional tank 96, the volume of the buffer 70C is increased as a whole, and it is possible to cope with the change in the suppression level of the pressure pulsation. It should be noted that the additional tank 96 may be coupled directly to the upstream side pipe 53.

Figure 6D:
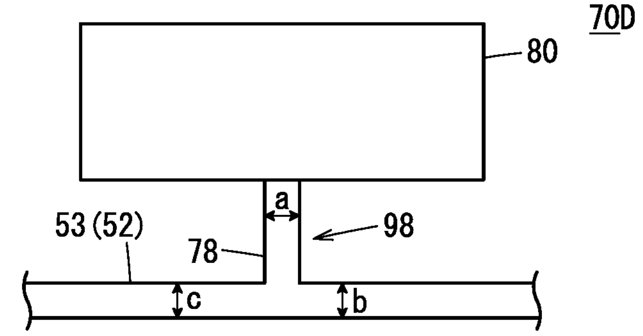
FIG. 6D is a diagram schematically showing a buffer according to a fourth modified embodiment.

Further, a buffer 70D according to a fourth modified embodiment shown in FIG. 6D has a structural unit 98 for allowing an operator to adjust the diameters (inner diameters) at the positions adjacent to connection portion between the hydrogen gas supply pipe 52 and the branch pipe 78. Specifically, the structural unit 98 can adjust at least one of the diameter of the branch pipe 78 at a position "a" adjacent to a connection portion, the diameter of the hydrogen gas supply pipe 52 at a position "b" adjacent to the upstream side of a connection portion connected to the branch pipe 78, and the diameter of the hydrogen gas supply pipe 52 at a position "c" adjacent to the downstream side of the connection portion connected to the branch pipe 78. In the buffer 70D, since the diameter of each of the positions "a" to "c" is adjusted suitably, it is possible to effectively suppress pressure pulsation relative to the volume change in the hydrogen gas supply pipe 52 and/or the buffer tank 80.

Technical concepts and advantages which can be understood from the above embodiments will be described below.

According to an aspect of the present invention, the fuel cell vehicle 10 is provided. The fuel cell vehicle 10 includes the fuel cell stack 12, the hydrogen gas supply pipe 52 configured to supply the hydrogen gas to the fuel cell stack 12, and the injector 64 provided at a position along the hydrogen gas supply pipe 52, and configured to inject the hydrogen gas to the fuel cell stack 12. The hydrogen gas supply pipe 52 includes the buffer 70, 70A to 70C provided on the upstream side of the injector 64. The hydrogen gas can flow through the buffer 70, 70A to 70C. The buffer 70, 70A to 70C includes the branch pipe 78 branched from the hydrogen gas supply pipe 52 and the buffer tank 80, 90, 92 coupled to the branch pipe 78 so as to allow the hydrogen gas to flow through the buffer tank 80, 90, 92.

In the fuel cell vehicle 10, since the hydrogen gas supply pipe 52 includes the branch pipe 78 and the buffer tank 80, 90, 92 which are arranged on the upstream side of the injector 64, the pressure pulsation of the hydrogen gas caused by operation of the injector 64 is suppressed suitably by the buffer 70, 70A to 70C. Further, it is possible to reduce the size of the buffet tank 80, 90, 92 in comparison with the buffer tank 102 having the serial structure, and moreover, it is possible to provide the buffer tank 80, 90, 92 in an appropriate space through the branch pipe 78. Therefore, in the fuel cell vehicle 10, it is possible to simplify accommodation of the buffer 70, 70A to 70C.

Further, the fuel cell vehicle 10 includes the auxiliary device case 46 attached to the fuel cell stack 12. The auxiliary device case 46 accommodates the injector 64. The buffer tank 80, 90, 92 is disposed above the injectors 64 in the gravity direction (side indicated by the arrow Cu) inside the auxiliary device case 46. Therefore, in the fuel cell vehicle 10, it is possible to dispose the buffer 70, 70A to 70C at a position adjacent to the injector 64, and pressure pulsation of the hydrogen gas is suppressed more suitably. Further, the auxiliary device case 46 protects the buffer 70, 70A to 70*c* where the hydrogen gas flows. Accordingly, it is possible to improve the safety.

Further, the auxiliary device case 46 is provided with the upper protrusion 86 protruding upward in the gravity direction (side indicated by the arrow Cu), and the buffer tank 80, 90, 92 is disposed in the expansion space 86*a* of the auxiliary device case 46 formed by the upper protrusion 86.

In the structure, in the auxiliary device case 46, it is possible to reliably provide the space for accommodating the buffer tank 80, 90, 92, and guide the hydrogen gas to the buffer tank 80, 90, 92 smoothly.

Further, the hydrogen gas supply pipe 52 comprises the hard metal pipe 53*c* inside the auxiliary device case 46, and the branch pipe 78 is connected to the metal pipe 53*c*. In the structure, in the auxiliary device case 46 of the fuel cell vehicle 10, it is possible to suppress vibration of the hydrogen gas supply pipe 52 (metal pipe 53*c*) caused by pulsation of the hydrogen gas, and absorb pulsation in the buffer 70, 70A to 70D.

Further, the branch pipe 78 protrudes upward in the gravity direction (side indicated by the arrow Cu) from the hydrogen gas supply pipe 52, and the buffer tank 80, 90, 92 is coupled to the upper end of the branch pipe 78. Therefore, in the fuel cell vehicle 10, the hydrogen gas can flow from the hydrogen gas supply pipe 52 into the buffer tank 80, 90, 92 through the branch pipe 78 more smoothly.

Further, the injector 64 and the buffer 70, 70A to 70C are installed in the front box Fb of the fuel cell vehicle 10, and the hydrogen gas supply pipe 52 extends under the floor of the fuel cell vehicle 10 to connect the hydrogen tank 58 provided on the rear side of the fuel cell vehicle 10 and the injector 64. The fuel cell vehicle 10 suppresses pressure pulsation of the hydrogen gas in the buffer 70, 70A to 70C on the front box Fb side, whereby vibration of the hydrogen gas supply pipe 52 extending under the floor of the fuel cell vehicle 10 is reduced. Therefore, it is possible to significantly suppress noises from the hydrogen gas supply pipe 52 to the vehicle compartment Vi.

Further, in the fuel cell vehicle 10, the hydrogen gas supply pipe 52 includes the heat exchanger 62 provided on the upstream side of the injectors 64, and the heat exchanger adjusts the temperature of the hydrogen gas. The buffer 70, 70A to 70C is provided on the upstream side or the downstream side of the heat exchanger 62. Therefore, in the fuel cell vehicle 10, it becomes easy to reliably create the space for installing the buffer 70, 70A to 70C. Accordingly, it is possible to design the layout of the fuel cell vehicle 10 more freely.

Further, the buffer 70D has the structural unit 98 capable of adjusting at least one of the diameter of the branch pipe 78 at the position “a” adjacent to the connection portion, the diameter of the hydrogen gas supply pipe 52 at the position “b” adjacent to the upstream side of the connection portion connected to the branch pipe 78, and the diameter of the hydrogen gas supply pipe 52 at the position “c” adjacent to the downstream side of the connection portion connected to the branch pipe 78. Therefore, in the buffer 70D, since the dimeter at each of the positions “a” to “c” is adjusted suitably, it is possible to effectively suppress pressure pulsation relative to the change in the volume of

What is claimed is:

1. A fuel cell vehicle comprising:

a fuel cell stack;

a hydrogen gas supply pipe configured to supply a hydrogen gas to the fuel cell stack; and an injector provided at a position along the hydrogen gas supply pipe, and configured to inject the hydrogen gas to the fuel cell stack, wherein the hydrogen gas supply pipe includes a buffer provided on an upstream side of the injector, the buffer being configured to allow the hydrogen gas to flow through the buffer;

the buffer includes a branch pipe branched from the hydrogen gas supply pipe and a buffer tank coupled to the branch pipe so as to allow the hydrogen gas to flow through the buffer tank; and an inside of the buffer tank has an unobstructed connection with an inside of the hydrogen gas supply pipe through the branch pipe.

2. The fuel cell vehicle according to claim 1, further comprising an auxiliary device case attached to the fuel cell stack, and configured to accommodate the injector, wherein the buffer tank is disposed above the injector in a gravity direction, inside the auxiliary device case.

3. The fuel cell vehicle according to claim 2, wherein the auxiliary device case is provided with an upper protrusion protruding upward in the gravity direction; and the buffer tank is disposed in an expansion space of the auxiliary device case formed by the upper protrusion.

4. The fuel cell vehicle according to claim 2, wherein the hydrogen gas supply pipe comprises a metal pipe inside the auxiliary device case; and the branch pipe is connected to the metal pipe.

5. The fuel cell vehicle according to claim 1, wherein the branch pipe protrudes upward in a gravity direction from the hydrogen gas supply pipe; and the buffer tank is coupled to an upper end of the branch pipe.

6. The fuel cell vehicle according to claim 1, the injector and the buffer are installed in a front box of the fuel cell vehicle; and the hydrogen gas supply pipe extends under a floor of the fuel cell vehicle, and is configured to connect a hydrogen tank provided on a rear side of the fuel cell vehicle and the injector.

7. The fuel cell vehicle according to claim 1, wherein the hydrogen gas supply pipe includes a heat exchanger provided on an upstream side of the injector, the heat exchanger being configured to adjust a temperature of the hydrogen gas; and the buffer is provided on an upstream side or on a downstream side of the heat exchanger.

* * * * *